(12) United States Patent
Taniguchi et al.

(10) Patent No.: US 7,704,127 B2
(45) Date of Patent: Apr. 27, 2010

(54) ELECTRODEPOSITED WIRE TOOL (75) Inventors: Kazuaki Taniguchi, Ichihara (JP);
Masahiro Nakano, Ichihara (JP);
Yoshitaka Manita, Ichihara (JP)

(73) Assignee: Asahi Diamond Industrial Co., Ltd., Tokyo (JP)

( * ) Notice: Subject to any disclaimer, the term of this patent is extended or adjusted under 35 U.S.C. 154(b) by 252 days.

(21) Appl. No.: 11/666,098

(22) PCT Filed: Sep. 5, 2005

(86) PCT No.: PCT/JP2005/020537
§ 371 (c)(1),
(2), (4) Date: Apr. 23, 2007

(87) PCT Pub. No.: WO2006/070534
PCT Pub. Date: Jul. 6, 2006

(65) Prior Publication Data
US 2009/0120422 A1    May 14, 2009

(30) Foreign Application Priority Data
Dec. 28, 2004 (JP) ............................ P2004-380182

(51) Int. Cl.
*B28D 1/08* (2006.01)
(52) U.S. Cl. ......................................... 451/296; 125/21
(58) Field of Classification Search .................... 125/21, 125/22, 16.02; 451/296
See application file for complete search history.

(56) References Cited
FOREIGN PATENT DOCUMENTS

| JP | 47-38690 | 12/1972 |
| JP | 57-201173 | 12/1982 |
| JP | 58-186569 | 10/1983 |
| JP | 2-24062 | 1/1990 |
| JP | 5-245759 | 9/1993 |
| JP | 7-292350 | 11/1995 |
| JP | 8-113774 | 5/1996 |
| JP | 2001-025975 | 1/2001 |
| JP | 2001-198834 | 7/2001 |
| JP | 2002-166370 | 6/2002 |
| JP | 2003-340729 | 12/2003 |
| JP | 2004-27283 | 1/2004 |
| JP | 2004-50301 | 2/2004 |

*Primary Examiner*—Robert Rose
(74) *Attorney, Agent, or Firm*—The Nath Law Group; Jerald L. Meyer; Robert T. Burns (57) ABSTRACT

A plating layer 18 of Ni or the like is formed around the outer peripheral face 14 of a wire tool 10, and super abrasive grains 16 are electrodeposited so as to be embedded in the plating layer 18. A coating layer 20 is formed on the surface of the super abrasive grains 16 to increase efficiency during electrodeposition. The thickness of the coating layer 20 formed on the super abrasive grains 16 is less than 0.1 μm, and preferably not more than 0.05 μm. The coating layer 20 is thin enough that its mass is less than 10% of the mass of the super abrasive grain 16. Accordingly, the super abrasive grains 16 are electrodeposited in a single layer around the outer peripheral face 14 of the core wire 12. As a result, the super abrasive grains 16 do not readily come off the core wire 12, which means that the wire tool will have a longer life. Also, since there is no need to remove any excess super abrasive grains after their electrodeposition, manufacturing costs can be cut and less work is entailed.

12 Claims, 6 Drawing Sheets

PRIOR ART

//* ELECTRODEPOSITED WIRE TOOL

TECHNICAL FIELD

This invention relates to an electrodeposited wire tool.

BACKGROUND ART

It is known that resin-bonded wire tools or electrodeposited wire tools, in which super abrasive grains (abrasive grains composed of diamond or CBN (Cubic Boron Nitride) with high hardness) have been adhered to the outer peripheral face of a long thin object that serves as a core wire, can be used to cut hard and brittle materials such as silicon and sapphire. A problem with resin-bonded wire tools in which the super abrasive grains are adhered to the core wire with a synthetic resin is that they wear out more quickly and the super abrasive grains are more prone to falling out than with an electrodeposited wire tool. In contrast, although an electrodeposited wire tool in which the super abrasive grains are adhered to the core wire by electrodeposition is more resistant to wear than a resin-bonded wire tool, a problem is that the plating process of electrodepositing the abrasive grains takes a long time. Consequently, it has been proposed in recent years that coated abrasive grains, the surface of which is coated with a coating layer composed of nickel, titanium, copper, or another such metal, be used in such electrodeposited wire tools in order to increase the electrodeposition rate during the manufacture of the wire tool (see Japanese Laid-Open Patent Application 2003-340729).

However, in the manufacture of an electrodeposited wire tool featuring coated abrasive grains, a problem is that an excess amount of abrasive grains are electrodeposited to the core wire in the course of electrodepositing the super abrasive grains by immersing the core wire in a plating bath containing super abrasive grains. The excess electrodeposited abrasive grains tend to fall off, which wastes the abrasive grains and also shortens the life of the wire tool. Also, if some treatment is performed to remove the excess electrodeposited abrasive grains from the core wire, this ends up taking more time and driving up the cost, and therefore lowers the wire tool manufacturing efficiency.

DISCLOSURE OF THE INVENTION

The present invention was conceived in light of this situation, and it is an object thereof to provide an electrodeposited wire tool to which abrasive grains have not been electrodeposited in an excess amount.

The present invention is an electrodeposited wire tool having a plurality of super abrasive grains fixed by electrodeposition to the outer peripheral face of a long thin object, wherein the surface of the super abrasive grains is covered with a coating layer containing a metal, and the thickness of the coating layer is less than 0.1 µm.

Alternatively, the present invention is an electrodeposited wire tool having a plurality of super abrasive grains fixed by electrodeposition to the outer peripheral face of a long thin object, wherein the surface of the super abrasive grains is covered with a coating layer containing a metal, and the mass of the coating layer is less than 10% of the mass of the super abrasive grain.

With this constitution, the coating layer is made thinner, so that the thickness of the coating layer is either less than 0.1 µm, or the mass of the coating layer is less than 10% of the mass of the super abrasive grain. Accordingly, only the minimum amount of current required for electrodepositing the necessary amount of super abrasive grains flows to the super abrasive grains during electrodeposition, so no excess abrasive grains are electrodeposited.

The present invention provides an electrodeposited wire tool to which abrasive grains have not been electrodeposited in an excess amount.

BEST MODE FOR CARRYING OUT THE INVENTION

An embodiment of the present invention will now be described through reference to the appended drawings.

Figure 1:
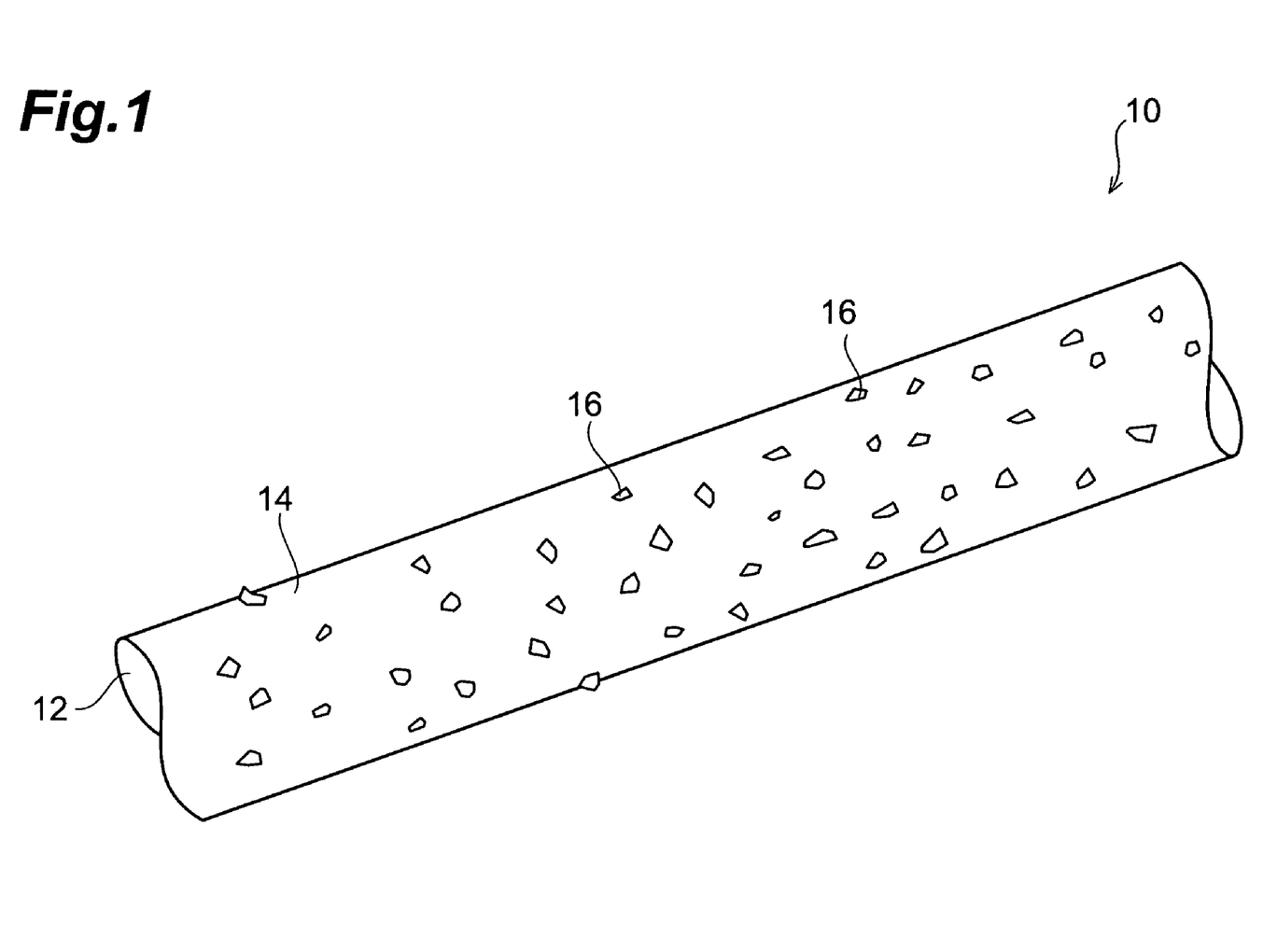
FIG. 1 is an oblique view of part of the wire tool pertaining to an embodiment.

FIG. 1 is an oblique view of part of the wire tool pertaining to this embodiment. As shown in FIG. 1, the wire tool 10 pertaining to this embodiment is constituted such that super abrasive grains 16 composed of diamond, CNB, or the like have been electrodeposited around the outer peripheral face 14 of a core wire 12 that is a long thin object composed of piano wire, twisted wire, or the like. The thickness of the core wire can be less than 1 mm, for example.

Figure 2:
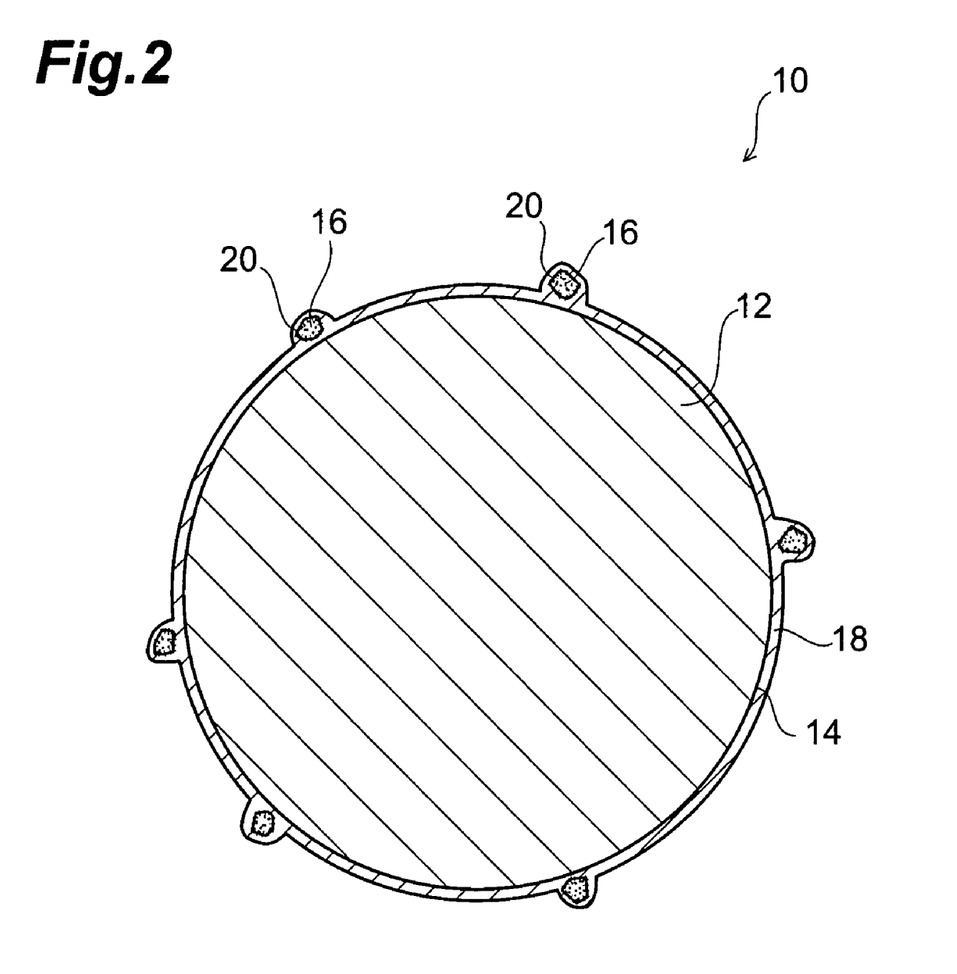
FIG. 2 is a lateral cross section of the wire tool pertaining to an embodiment.
Figure 3:
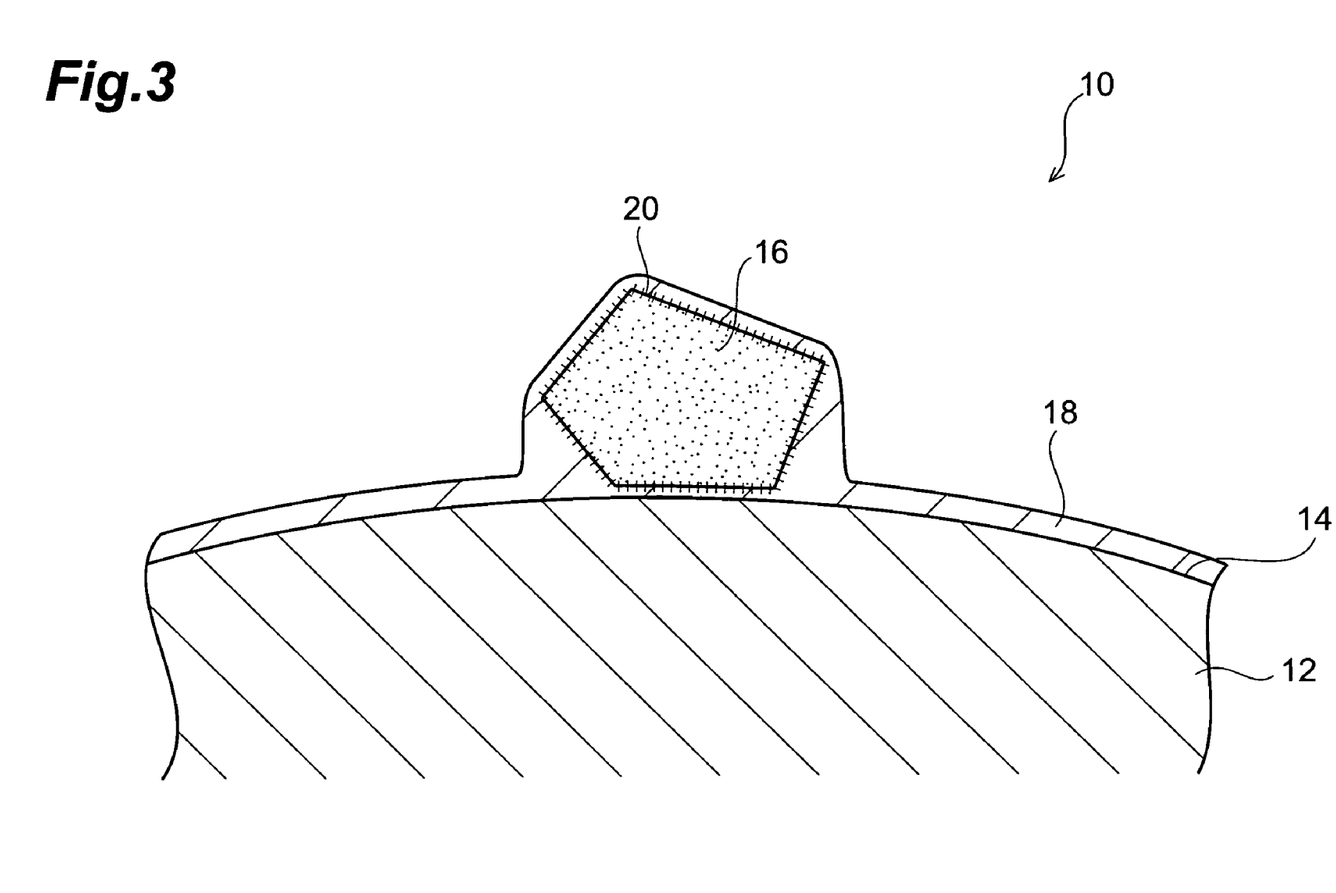
FIG. 3 is a detail view of the area near the outer peripheral face in a lateral cross section of the wire tool pertaining to an embodiment.

FIG. 2 is a lateral cross section of the wire tool pertaining to this embodiment. FIG. 3 is a detail view of the area near the outer peripheral face in a lateral cross section of the wire tool pertaining to this embodiment. As shown in FIGS. 2 and 3, a plating layer 18 of nickel or the like is formed around the outer peripheral face 14 of the wire tool 10, and the super abrasive grains 16 are electrodeposited so as to be embedded in the plating layer 18. A coating layer 20 composed of a material selected from among Ti, Ni, Cu, TiC, and SiC is formed on the surface of the super abrasive grains 16 to improve efficiency during electrodeposition. Using a coating layer 20 composed of TiC is even more preferable because resistivity will be higher in the super abrasive grains 16 and the coating layer 20. The average grain size of the super abrasive grains 16 is preferably from 1 to 60 µm.

The thickness of the coating layer 20 formed on the super abrasive grains 16 is less than 0.1 µm, and preferably not more than 0.05 µm. The mass of the coating layer 20 is less than 10%, and preferably less than 5%, of the mass of the super abrasive grain 16.

The coating layer of conventional coated abrasive grains was thicker, the thickness ranging from 0.1 to 10 µm, and was 1 µm in one case. Also, the weight percentage of the coating layer in conventional coated abrasive grains is increased to between 30 and 55%, for example, and a thick coating layer is provided (see paragraph 0037 of the above-mentioned Japanese Laid-Open Patent Application 2003-340729, for example). This is because increasing the thickness of the coating layer and thereby raising conductivity was considered important in order to make the electrodeposition more efficient.

Figure 5:
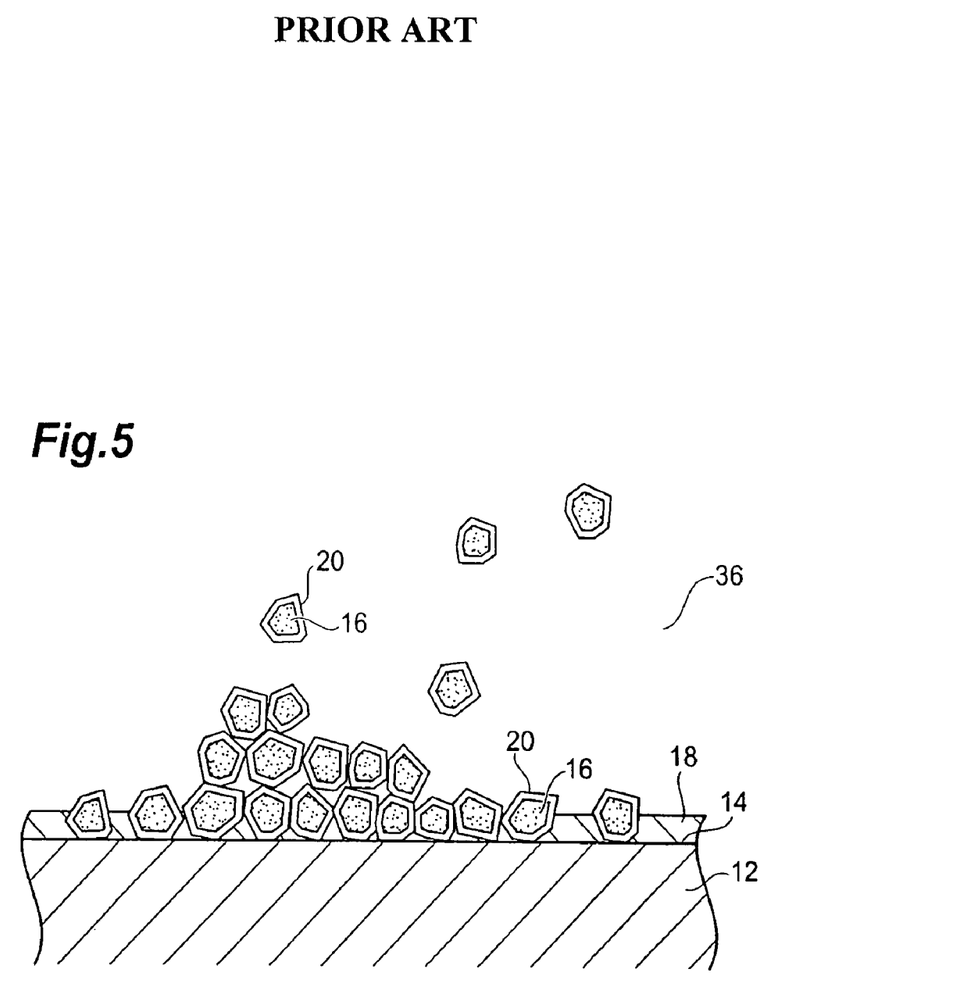
FIG. 5 is a diagram of how the super abrasive grains are electrodeposited in a plating bath onto the core wire of a conventional wire tool.

FIG. 5 is a diagram of how the super abrasive grains are electrodeposited in a plating bath onto the core wire of a conventional wire tool. As shown in FIG. 5, when the super abrasive grains 16 with the thick coating layer 20 are electrodeposited onto the core wire 12 in a plating bath 36, the super abrasive grains 16 tend to be electrodeposited in clumps because of the high conductivity of the super abrasive grains 16 coated with the thick coating layer 20. Consequently, the super abrasive grains 16 are electrodeposited in an excess amount.

Figure 6:
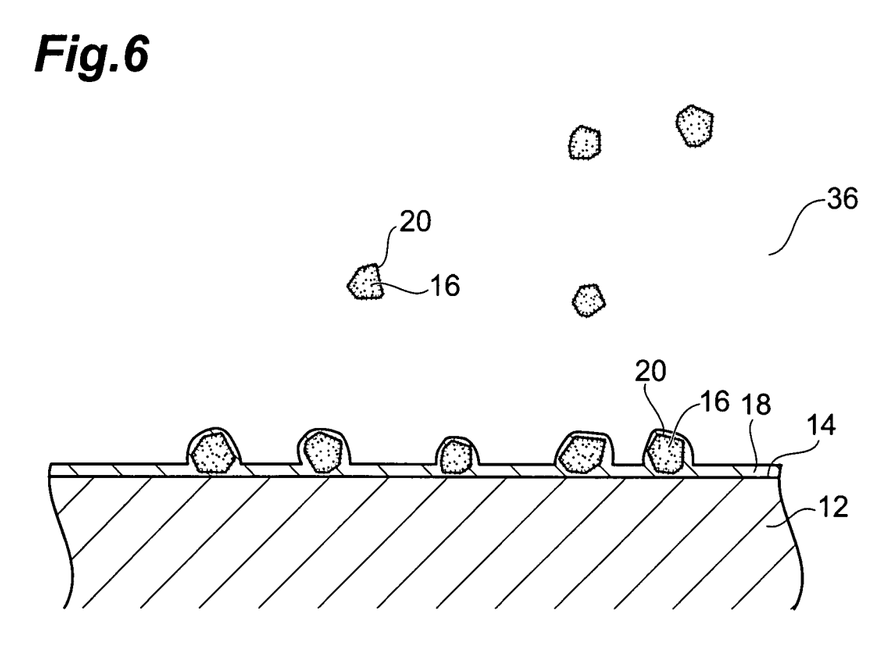
FIG. 6 is a diagram of how the super abrasive grains are electrodeposited in a plating bath onto the core wire of the wire tool pertaining to an embodiment.

FIG. 6 is a diagram of how the super abrasive grains are electrodeposited in a plating bath onto the core wire of the wire tool pertaining to the above embodiment. As shown in FIG. 6, when the super abrasive grains 16 with the thin coating layer 20 pertaining to this embodiment are electrodeposited onto the core wire 12 in a plating bath 36, no excess current flows to the super abrasive grains 16 during their electrodeposition, so the super abrasive grains 16 are not electrodeposited in an excess amount onto the core wire 12. Accordingly, the super abrasive grains 16 are electrodeposited in a single layer and a suitable density around the outer peripheral face 14 of the core wire 12. As a result, the super abrasive grains 16 do not readily come off the core 12, which means that the wire tool will have a longer life. Also, since there is no need to remove any excess super abrasive grains after their electrodeposition, manufacturing costs can be cut and less work is entailed.

CVD, PVD, plating, dipping, or another such method can be used to form a thin coating layer on the surface of the super abrasive grains.

Figure 4:
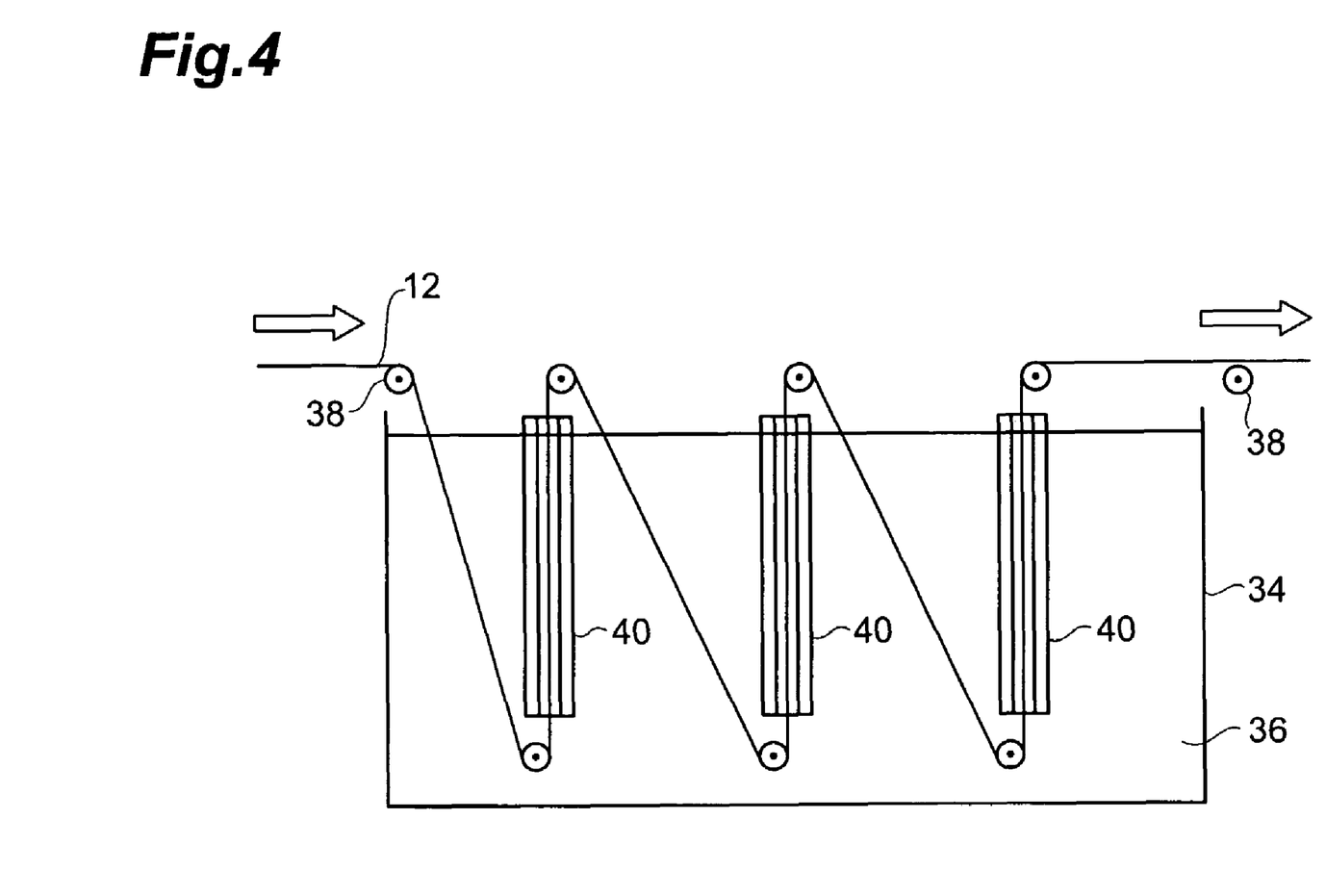
FIG. 4 is a diagram illustrating the process of electrodepositing super abrasive grains onto the core wire of the wire tool pertaining to an embodiment.

FIG. 4 is a diagram illustrating the process of electrodepositing super abrasive grains onto the core wire of the wire tool pertaining to this embodiment. As shown in FIG. 4, a plating tank 34 is filled with a plating bath 36. The plating bath 36 is, for example, a sulfamic acid bath composed of nickel sulfamate, nickel chloride, and boric acid. The super abrasive grains on whose surface the thin coating layer has been formed as discussed above are mixed into the plating bath 36. The core wire 12 is conveyed in the direction indicated by the arrow in the drawing while immersed in the plating bath 36. Part of the pulley that supports the core wire 12 serves as a cathode 38, and a negative potential is applied. An anode 40 is provided surrounding the core wire 12 immersed in the plating bath 36, and a positive potential is applied.

During electrodeposition, the core wire 12 is conveyed in the direction of the arrow while voltage is applied to the cathode 38 and the anode 40. The core 12 can be conveyed at a speed of 1 meter per minute or faster. Because the coating layer of the super abrasive grains in the plating bath 36 is so thin, only the minimum amount of current needed for electrodeposition flows. As the result, as described with reference to FIG. 6, the super abrasive grains are electrodeposited in a single layer on the core wire 12. This means that the electrodeposited super abrasive grains do not readily fall off, and the wire tool has a longer life. Also, the step of removing excess super abrasive grains can be left out.

The wire tool of the present invention is not limited to the above embodiment, and various modifications can, of course, be added without deviating from the gist of the present invention.

The invention claimed is:

1. An electrodeposited wire tool, having a plurality of super abrasive grains fixed by electrodeposition to an outer peripheral face of a long thin object, wherein the super abrasive grains are fixed by only a plated layer electrodeposited to the outer peripheral face of the long thin object, wherein an entire surface of the super abrasive grains is covered with a coating layer containing a material selected from among TiC and SiC, and the thickness of the coating layer on the surface of the super abrasive grains is less than 0.1 μm.

2. An electrodeposited wire tool, having a plurality of super abrasive grains fixed by electrodeposition to an outer peripheral face of a long thin object, wherein the super abrasive grains are fixed by only a plated layer electrodeposited to an outer peripheral face of the long thin object, wherein an entire surface of the super abrasive grains is covered with a coating layer containing a material selected from among TiC and SiC, and the mass of the coating layer on the surface of the super abrasive grain is less than 10% of the mass of the super abrasive grain.

3. An electrodeposited wire tool according to claim 1, wherein the super abrasive grains are fixed to the outer peripheral face of the long thin object in a single layer.

4. An electrodeposited wire tool according to claim 2, wherein the super abrasive grains are fixed to the outer peripheral face of the long thin object in a single layer.

5. An electrodeposited wire tool according to claim 1, wherein the average grain size of the super abrasive grains is from 1 to 60 μm.

6. An electrodeposited wire tool according to claim 2, wherein the average grain size of the super abrasive grains is from 1 to 60 μm.

7. An electrodeposited wire tool according to claim 1, wherein all of the super abrasive grains are covered with the coating layer.

8. An electrodeposited wire tool according to claim 2, wherein all of the super abrasive grains are covered with the coating layer.

9. An electrodeposited wire tool according to claim 1, wherein the thickness of the coating layer is less than 0.05 μm.

10. An electrodeposited wire tool according to claim 2, wherein the mass of the coating layer is less than 5% of the mass of the super abrasive grains.

11. An electrodeposited wire tool, having a plurality of super abrasive grains fixed by electrodeposition to an outer peripheral face of a wire, wherein the super abrasive grains are fixed by only a plated layer electrodeposited to the outer peripheral face of the wire;

an entire surface of the super abrasive grains is covered with a coating layer containing a material selected from among TiC and SiC;

the thickness of the coating layer on the super abrasive grains is less than 0.1 μm;

the average grain size of the super abrasive grains is from 1 to 60 μm; and the super abrasive grains are fixed to the outer peripheral face of the wire in a single layer.

12. An electrodeposited wire tool, having a plurality of super abrasive grains fixed by electrodeposition to an outer peripheral face of a wire, wherein the super abrasive grains are fixed by only a plated layer electrodeposited to the outer peripheral face of the wire;

an entire surface of the super abrasive grains is covered with a coating layer containing a material selected from among TiC and SiC;

the mass of the coating layer on the super abrasive grains is less than 10% of the mass of the super abrasive grain;

the average grain size of the super abrasive grains is from 1 to 60 μm; and the super abrasive grains are fixed to the outer peripheral face of the wire in a single layer.

\* \* \* \* \*

UNITED STATES PATENT AND TRADEMARK OFFICE
CERTIFICATE OF CORRECTION

PATENT NO. : 7,704,127 B2
APPLICATION NO. : 11/666098
DATED : April 27, 2010
INVENTOR(S) : Kazuaki Taniguchi et al.

It is certified that error appears in the above-identified patent and that said Letters Patent is hereby corrected as shown below:

On the Title Page
Please correct the following data:

Please delete Item "(22) PCT Filed:   Sep. 5, 2005"
and replace with Item -- (22) PCT Filed:   Nov. 9, 2005 --

Signed and Sealed this

Eighth Day of June, 2010

David J. Kappos
*Director of the United States Patent and Trademark Office*